United States Patent
Nakayama (10) Patent No.: US 8,547,562 B2
(45) Date of Patent: Oct. 1, 2013

(54) IMAGE FORMING DEVICE AND IMAGE FORMING METHOD

(75) Inventor: Hiroto Nakayama, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1034 days.

(21) Appl. No.: 12/572,809

(22) Filed: Oct. 2, 2009

(65) Prior Publication Data

US 2010/0110466 A1    May 6, 2010

(30) Foreign Application Priority Data

Oct. 31, 2008 (JP) .................................. 2008-282227

(51) Int. Cl.
*G06F 3/12* (2006.01)

(52) U.S. Cl.
USPC ........................................ 358/1.13; 358/1.15

(58) Field of Classification Search
None
See application file for complete search history.

(56) References Cited

U.S. PATENT DOCUMENTS

| | | | |
|---|---|---|---|
| 6,281,980 B1 | 8/2001 | Maemura et al. | |
| 2004/0057066 A1 | 3/2004 | Sugishita et al. | |
| 2007/0268508 A1 | 11/2007 | Kitamura | |
| 2008/0220347 A1* | 9/2008 | Tomita et al. | 430/48 |

FOREIGN PATENT DOCUMENTS

| | | |
|---|---|---|
| JP | 7-131582 | 5/1995 |
| JP | 8-265481 | 10/1996 |
| JP | 10-217583 | 8/1998 |
| JP | 10-308834 | 11/1998 |
| JP | 11-136404 | 5/1999 |
| JP | 11-168590 | 6/1999 |
| JP | 11-266332 | 9/1999 |
| JP | 2004-82701 | 3/2004 |
| JP | 2006-317871 | 11/2006 |

OTHER PUBLICATIONS

English translation of japanese reference JP 10217583.*
Japanese Official Action dated Aug. 24, 2010 with English language translation.

* cited by examiner

*Primary Examiner* — Twyler Haskins
*Assistant Examiner* — Lennin RodriguezGonzalez
(74) *Attorney, Agent, or Firm* — Scully, Scott, Murphy & Presser, PC (57) ABSTRACT

An image forming device includes an operation unit, a job executing unit, a receiving unit, a first determining unit, and a second determining unit. The print job received at the receiving unit contains information about an amount of print resource to be consumed. The first determining unit determines whether the receiving unit receives a print job while the user is setting another print job by the operation unit. The second determining unit determines whether the print resource remains as much as both the received print job and the another print job can be executed when the first determining unit determines that the receiving unit receives the print job while the user is setting the another print job by the operation unit. The job executing unit sets an order of priority for executing the print job based on the determination result of the second determining unit.

9 Claims, 8 Drawing Sheets

NUMBER OF RECORDING SHEETS NECESSARY FOR THE PRINT JOB

12 SHEETS

PLEASE INPUT TOTAL NUMBER OF SHEETS TO BE PRINTED.

IMAGE FORMING DEVICE AND IMAGE FORMING METHOD

CROSS REFERENCE TO RELATED APPLICATION

This application claims priority from Japanese Patent Application No. 2008-282227 filed on Oct. 31, 2008. The entire content of the priority application is incorporated herein by reference.

TECHNICAL FIELD

The invention relates to an image forming device and an image forming method.

BACKGROUND

It has been well known that a conventional digital multifunction image processing device prevents a request for a print output from interrupting in a setting operation for a copying process. The copying process is given priority over the request for a print output.

SUMMARY

In such a conventional digital multifunction image processing device, if a user is setting a copying process, another user who intends to execute a print output through an external device needs to wait until the copying process is completed. The conventional digital multifunction image processing device is not user-friendly for the user who intends to execute the print output through the external device. The invention is thus attained to solve the above problem.

In view of the foregoing, it is an object of the invention to provide an image forming device and an image forming method to improve its accessibility without imposing one-sided burdens either on a user who sets a print job through an operation unit of the image forming device or on a user who transmits a print job through an external device.

In order to attain the above and other objects, the invention provides an image forming device. The image forming device includes an operation unit, a job executing unit, a receiving unit, a first determining unit, and a second determining unit. A user sets a print job to print an image on a recording sheet by the operation unit. The job executing unit is configured to execute a print job. The job executing unit consumes print resource through the print job. The receiving unit is configured to receive a print job from an external device. The print job received at the receiving unit contains information about an amount of print resource to be consumed when executed by the job executing unit. The first determining unit is configured to determine whether the receiving unit receives a print job while the user is setting another print job by the operation unit. The second determining unit is configured to determine whether the print resource remains as much as both the received print job and the another print job can be executed when the first determining unit determines that the receiving unit receives the print job while the user is setting the another print job by the operation unit. The job executing unit sets an order of priority for executing the print job among the received print job and the another print job based on the determination result of the second determining unit.

According to another aspect, the invention provides an image forming device. The image forming device includes an operation unit, a job executing unit, a receiving unit, a determining unit, and a prompting unit. A user sets a print job to print an image on a recording sheet by the operation unit. The job executing unit is configured to execute a print job. The job executing unit consuming print resource through the print job. The receiving unit is configured to receive a print job from an external device. The print job received at the receiving unit contains information about an amount of print resource to be consumed when executed by the job executing unit. The determining unit is configured to determine whether the receiving unit receives a print job while the user is setting another print job by the operation unit. The prompting unit prompts the user to set an order of priority for executing the print job among the received print job and the another print job by the operation unit when the determining unit determines that the receiving unit receives the print job while the user is setting another print job by the operation unit. The job executing unit executes the received print job and the another print job in the order of priority set by the user.

According to another aspect, the invention provides an image forming device. The image forming device includes an operation unit, a job executing unit, a receiving unit, a first determining unit, and a second determining unit. A user sets a print job to print an image on a recording sheet by the operation unit. The job executing unit is configured to execute a print job. The job executing unit consumes print resource through the print job. The receiving unit is configured to receive a print job from an external device. The print job received at the receiving unit contains information about an amount of print resource to be consumed when executed by the job executing unit. The first determining unit is configured to determine whether the receiving unit receives a print job after the user sets another print job by the operation unit. The second determining unit is configured to determine whether the print resource remains as much as both the received print job and the another print job can be executed if the first determining unit determines that the receiving unit receives the print job after the user sets the another print job by the operation unit. The job executing unit sets an order of priority for executing the print job among the received print job and the another print job based on the determination result of the second determining unit.

According to another aspect, the invention provides a method for forming an image by an image forming device. The method includes (a) receiving an operation, by a user, to set a print job printing an image on a recording sheet, (b) executing a print job wherein print resource is consumed through the print job by the executing step (b), (c) receiving a print job from an external device wherein the print job received from the external device in the receiving step (c) contains information about an amount of print resource to be consumed when executed by the executing step (b), (d) determining whether the receiving step (c) receives the print job while the user is setting another print job through the receiving step (a), and (e) determining whether the print resource remains as much as both the received print job and the another print job can be executed when the determining step (d) determines that the receiving step (c) receives a print job while the user is setting the another print job through the receiving step (a). The executing step (b) sets an order of priority for executing the print job among the received print job and the another print job based on the determination result of the determining step (e).

According to another aspect, the invention provides a method for forming an image by an image forming device. The method includes (a) receiving an operation, by a user, to set a print job printing an image on a recording sheet, (b) executing a print job wherein print resource is consumed through the print job by the executing step (b), (c) receiving a print job from an external device wherein the print job received from the external device in the receiving step (c) contains information about an amount of print resource to be consumed when executed by the executing step (b), (d) determining whether the receiving step (c) receives a print job while the user is setting another print job through the receiving step (a), (e) prompting the user to set an order of priority for executing the print job among the received print job and the another print job set through the receiving step (a) when the determining step (d) determines that the receiving step (c) receives a print job while the user is setting another print job through the receiving step (a). The executing step (b) executes the received print job and the another print job in the order of priority set by the user through the prompting step (e).

According to another aspect, the invention provides a method for forming an image by an image forming device. The method includes (a) receiving an operation, by a user, to set a print job printing an image on a recording sheet, (b) executing a print job wherein print resource is consumed through the print job by the executing step (b), (c) receiving a print job from an external device wherein the print job received from the external device in the receiving step (c) contains information about an amount of print resource to be consumed when executed by the executing step (b), (d) determining whether the receiving step (c) receives a print job after the user sets another print job through the receiving step (a), and (e) determining whether the print resource remains as much as both the received print job and the another print job can be executed if the determining step (d) determines that the receiving step (c) receives a print job after the user sets the another print job through the receiving step (a). The executing step (b) sets an order of priority for executing the print job among the received print job and the another print job based on the determination result of the determining step (e).

BRIEF DESCRIPTION OF THE DRAWINGS

The particular features and advantages of the invention as well as other objects will become apparent from the following description taken in connection with the accompanying drawings, in which.

DETAILED DESCRIPTION

First Embodiment

Figure 1:
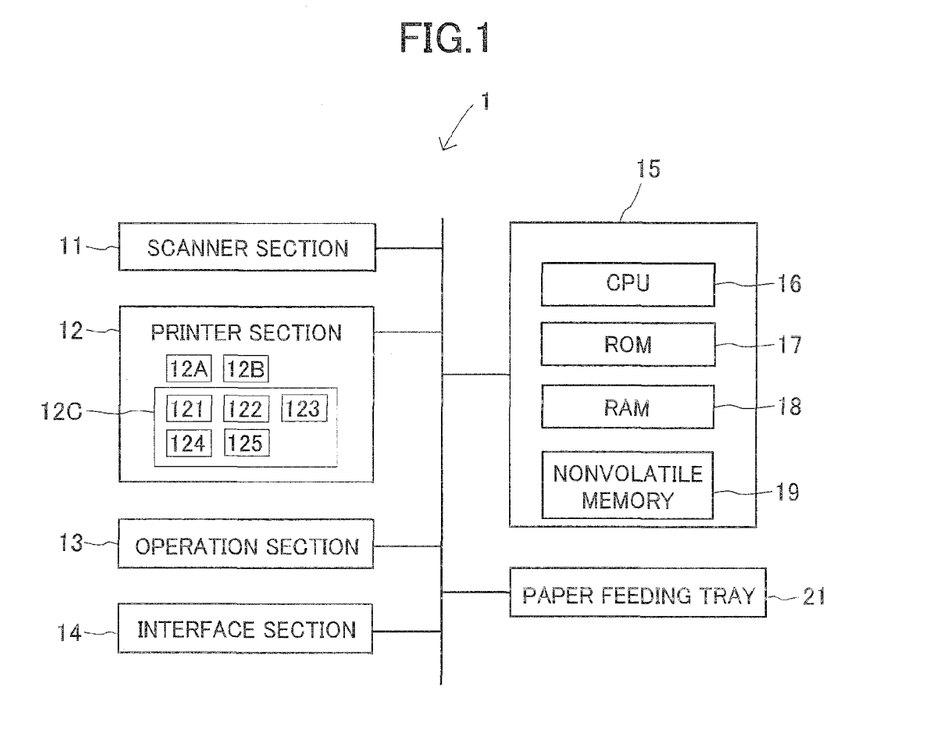
FIG. 1 is a block diagram showing an electrical structure of an image forming device according to a first embodiment of the invention.
Figure 2:
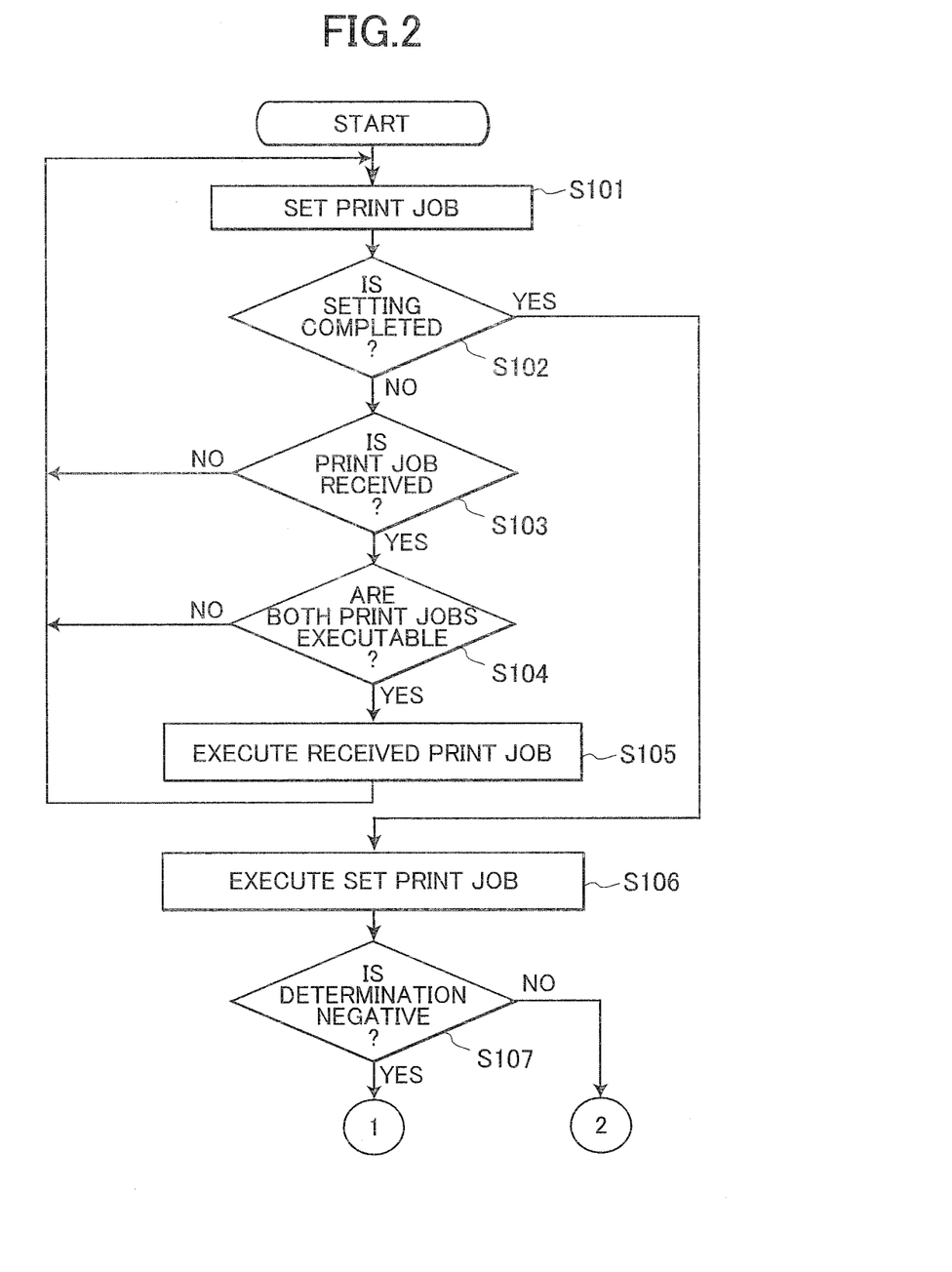
FIG. 2 is a flowchart illustrating steps in a process executed by a control section of the image forming device according to the first embodiment.
Figure 3:
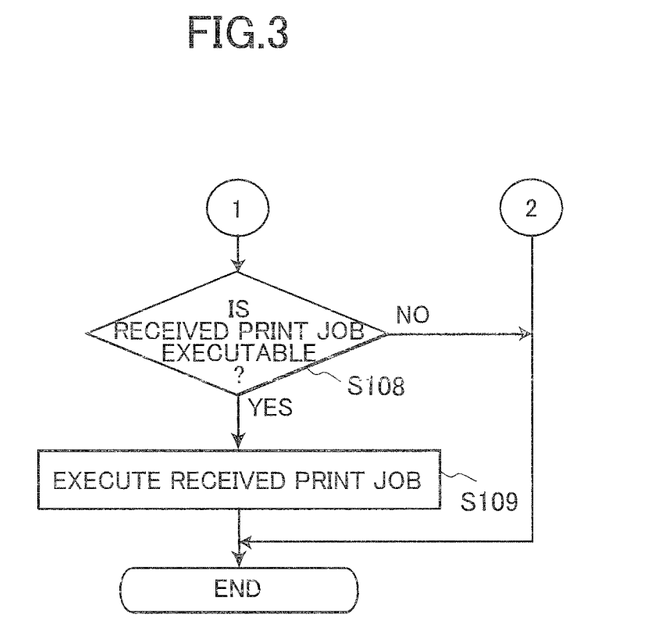
FIG. 3 is a flowchart illustrating a part of steps in a process executed by the control section of the image forming device according to the first embodiment.

Next, a multifunction device according to a first embodiment of the invention will be described with reference to FIGS. 1 to 3.

(1) Structure of Multifunction Device (1-1) Electrical Structure of Multifunction Device A multifunction device 1 includes a scanner section 11, a printer section 12, an operation section 13, an interface section 14, a paper feeding tray 21, and a control section 15.

The scanner section 11 includes a first platen glass for placing a document thereon, a second platen glass juxtaposed with the first platen glass, an ADF (automated document feeder) for conveying a document accommodated in the paper feeding tray 21 to the second platen glass on a sheet-by-sheet basis, an image sensor in which a plurality of light receiving elements are aligned, and an image processing section. To read a document placed on the first platen glass, the scanner section 11 moves the image sensor in a sub-scanning direction (a direction perpendicular to a extending direction of the image sensor) at a constant speed. On the other hand, when a document accommodated in the paper feeding tray 21 is read, the scanner section 11 keeps the image sensor stayed under the second platen glass while the document is conveyed to the second platen glass by the ADF. The image sensor outputs a pixel signal according to electric charges accumulated in each of the light receiving elements. The image processing section processes the pixel signal outputted from the image sensor to generate image data.

The printer section 12 is a laser type image forming device, and forms an image on a recording sheet. The printer section 12 includes a paper tray 12A for accommodating a recording sheet, such as recording sheet, a conveying mechanism 12B for conveying the recording sheet accommodated in the paper tray 12A on a sheet-by-sheet basis along a paper conveying path, and a printing unit 12C for forming an image on the recording sheet based on the image data. The printing unit 12C includes toner accommodated in a toner accommodating unit 121 as color material, a photosensitive drum 122, an exposing unit 123 for forming an electrostatic latent image by irradiating the photosensitive drum with a laser beam, a developing roller 124 for developing the latent image to provide a toner image, and a transfer roller 125 for transferring the toner deposited on the photosensitive drum onto the recording sheet.

The operation section 13 includes a plurality of buttons and an LCD (liquid crystal display). The operation section 13 enables a user to input various settings including a setting of a print job through the buttons, with reference to a screen displayed on the LCD.

The interface section 14 includes a network interface and a modem. The interface section 14 receives a print job from an external device including a personal computer and a facsimile device. Further, the interface section 14 is provided with a USB host interface to which an external USB storage device is connected. The interface section 14 may be provided with a reader/writer for reading and writing a removable flash memory.

The control section 15 includes a CPU (central processing unit) 16, a ROM (read only memory) 17, and a RAM (random access memory) 18, and a nonvolatile memory 19. The control section 15 controls each section of the multifunction device 1.

(1-2) Counter Value

The multifunction device 1 is configured such that an administrator can set the total number of printable sheets. When the administrator sets the total number, a value of the total number is stored in the nonvolatile memory 19 as a counter value. When each sheet is printed, the counter value is decremented by one. The counter value is logically decremented each time a sheet of paper is printed. When the counter value reaches zero, no further printing process is permitted until the administrator resets the total number of printable sheets.

(2) Print Job

A print job is a unit of the printing process when an image is printed on a recording sheet based on image data. The print job includes various setting information relating to the printing process. The setting information includes information to specify image data to be printed, information to specify the number of recording sheets necessary for the printing process, the size of the recording sheet, monochromatic printing or color printing, the scaling ratio, single-sided printing or double-sided printing, and the number of sets of prints.

The information to specify image data to be printed may be the image data itself or may be an address indicating a location where the image data is stored. The information to specify the number of recording sheets necessary for the printing process may be the number itself of sheets to be printed. If the number of sheets to be printed can be specified by the size of the image data or the size of the recording sheet, the size of the image data or the size of the recording sheet may be used as the information to specify the number of recording sheets necessary for the printing process.

In order to execute the print job in the multifunction device 1, the user operates the operation section 13 to set the print job. Alternatively, the user transmits the print job from the external device.

When the print job is set in the operation section 13, a plurality of sheets of document accommodated in the paper feeding tray 21 is read on a sheet-by-sheet basis to generate image data. Based on the generated image data, the print job (copying job) is executed to print an image on a recording sheet. The print job is also executed to print an image on a recording sheet based on image data stored in the USB storage device or the RAM 18. The setting information relating to the printing process is set in the operation section 13 in order to execute the print job.

When the print job is transmitted to the multifunction device 1 from the external device, the print job may be transmitted through a local area network (LAN) from a personal computer. Alternatively, the print job may be transmitted as facsimile data through a public telephone line from a facsimile device. When the print job is transmitted to the multifunction device 1 from the external device, the print job includes at least the information to specify image data to be printed and the information to specify the number Z (described later) of recording sheets necessary for the printing process.

(3) Print Resources

Print resources according to the present embodiment include physical print resources and logical print resources which are consumed to execute the printing process. When all the print resources are consumed, no further printing process can be executed. The user may be required to take additional measures in order to continue executing the print job.

The physical print resources include the recording sheet accommodated in the paper tray 12A and the toner. The recording sheet and the toner are consumed when the printing process is executed. No printing process can be executed when the recording sheet or the toner is run out.

The logical print resources include the counter value described above and the remaining number of rotations of the photosensitive drum. In general, the photosensitive drum degrades as it is used, and therefore, an upper limit to the number of rotations is predetermined as to how many times the photosensitive drum can rotate in its lifetime. The remaining number of rotations indicates a difference between the predetermined upper limit and the number of rotation that the photosensitive drum has so far rotated. The remaining number of rotations is logically consumed each time the printing process is executed, until the number of rotations reaches the upper limit. When the remaining number of rotations is run out, the user is required to replace the photosensitive drum with a new one. In the following explanation, the counter value serves as the print source as an example.

(4) Process Flow in Execution of Print Job by Multifunction Device

A process flow executed in the control section 15 will be described while referring to FIGS. 2 and 3, and then, some specific examples exemplifying in what order the print jobs are executed.

(4-1) Process Flow

A process executed in the control section 15 starts when the user operates the operation section 13 to start a setting of the various setting information. Here, the process will be described with the counter value as the print resource and the copying job as the print job set in the operation section 13.

In S101, the user operates the operation section 13 to set the print job (the copying job).

In S102, the control section 15 determines whether the setting of the print job has been completed. For example, having input the various setting information, the user presses a copy-start button provided in the operation section 13. The control section 15 determines that the setting of the print job has been completed when the copy-start button is pressed. That is, until the copy button is pressed, the setting of the print job is not completed. The control section 15 determines at a constant time interval whether the copy-start button is pressed after the setting of the print job started. If the copy-start button is not pressed (S102: No), the routine advances to S103. If the copy-start button is pressed (S102: Yes), the routine advances to S106.

In S103, the control section 15 determines whether the control section 15 has received a print job from an external device through the interface section 14. If the control section 15 has received the print job from the external device through the interface section 14 (S103: Yes), the routine advances to S104. If the control section 15 has not received the print job from the external device through the interface section 14 (S103: No), the routine returns to S101.

In S104, the control section 15 determines whether the counter value remains as much as the both of the currently setting print job and the received print job can be executed. In other words, the control section 15 determines whether the counter value is greater than or equal to a number of recording sheets required for both of the currently setting print job and the received print job. Specifically, based on the current counter value X read from the nonvolatile memory 19, the number Y of recording sheets necessary for executing the currently setting print job, and the number Z of recording sheets necessary for executing the received print job, the control section 15 determines that the counter value remains as much as the both of the print jobs can be executed if the following formula is satisfied:

$$X \geq Y + Z \qquad \text{Formula 1}$$

As described above, the received print job contains information to specify the number Z. The number Z can be uniquely specified when the control section 15 receives the print job from the external device.

However, in case of the currently setting print job, the number Y cannot be specified until the setting of the print job has been completed. In particular, in case of the copying job, even if the setting of the copying job has been completed, the number Y cannot be specified until the copying job has been actually executed. This is because the number of sheets of document accommodated in the paper feeding tray 21 cannot be specified until the copying job has been executed.

According to the present embodiment, the control section 15 estimates the number of recording sheets necessary for executing the copying job. The estimated number of recording sheets is applied to the number Y. Applying the estimated number to the number Y enables the control section 15 to determine, prior to actually executing these print jobs, whether the counter value remains as much as the both of the print jobs can be executed.

As the estimated number, the average number of recording sheets to be consumed per print job may be used. However, if the estimated number is assumed less than the actual number of recording sheets to be consumed, the control section 15 may inaccurately determine that the counter value remains as much as the both of the print jobs can be executed. In this case, after the received print job has been executed, the counter value may run out while the currently setting print job is being executed. Consequently, even if the currently setting print job is executed, the control section 15 may not complete executing the same.

According to the present embodiment, a maximum value of the counter value to be consumed per print job is applied to the estimated number. That is, the multifunction device 1 is limited to consume the print resource not to exceed the maximum value in one print job. Applying the maximum value to the estimated number ensures that the counter value remains equal to or more than the maximum value when the currently setting print job is executed subsequent to the received print job. Accordingly, it is not likely to run out the counter value while the currently setting print job is executed.

As the maximum value, the maximum number of sheets of document accommodatable in the paper feeding tray 21 may be used when the copying job is executed with the ADF. Assuming that one recording sheet is consumed per one sheet of document to be duplicated, the number of recording sheets to be consumed per copying job is equal to or less than the maximum number of sheets of document accommodatable in the paper feeding tray 21. Hence the maximum number of sheets of document accommodatable in the paper feeding tray 21 is equivalent to the maximum value of the counter value to be consumed per print job.

If the control section 15 determines that the counter value remains as much as the both of the print jobs can be executed (S104: Yes), the routine advances to S105. If the control section 15 determines that the counter value does not remain as much as the both of the print jobs can be executed (S104: No), the routine returns to S101.

In S105, the control section 15 executes the received print job. While executing the received print job, the control section 15 decrements the counter value by one per printed sheet.

In S106, the control section 15 executes the print job set in S101. While executing the print job set in S101, the control section 15 decrements the counter value by one per printed sheet.

In S107, the control section 15 determines whether the control section 15 has determined in S104 that the counter value does not remain as much as both of the print jobs can be executed. As described above, the number Y cannot be specified until the currently setting print job is actually executed. For this reason, even if the control section 15 has determined in S104 that the counter value does not remain as much as both of the print jobs can be executed, the counter value may remain as much as the received print job can be executed after the print job set in S101 has been executed. For example, if the maximum value is applied to the estimated number, the counter value is rarely consumed up to the maximum value in fact. Accordingly, after the print job set in S101 has been executed, the counter value may remain as much as the received print job can be executed.

If the counter value remains as much as the received print job can be executed, it is desirable to execute the received print job in order to improve accessibility to the multifunction device 1 of the user who transmitted the print job from the external device.

The control section 15 thus determines whether the control section 15 has determined in S104 that the counter value remains as much as both of the print jobs can be executed (positive determination) or the counter value does not remain as much as both of the print jobs can be executed (negative determination). If the negative determination has been made in S104 (S107: Yes), the routine advances to S108. If the positive determination has been made in S104 (S107: No), the control section 15 ends the process because the received print job has already been executed in S105.

In S108, the control section 15 determines whether the counter value remains as much as the received print job can be executed. If the control section 15 determines that the counter value remains as much as the received print job can be executed (S108: Yes), the routine advances to S109. If the control section 15 determines that the counter value does not remain as much as the received print job can be executed (S108: No), the control section 15 ends the process.

In S109, the control section 15 executes the received print job. While executing the received print job, the control section 15 decrements the counter value by one per printed sheet.

(4-2) Specific Examples

Some specific examples will be described to illustrate in what order the print jobs are executed when the above process is executed in accordance with the above process flow.

Example 1

In an example 1, the control section 15 does not receive a print job from an external device while a user operates the operation section 13 to set another print job. In this case, the control section 15 determines in S103 that no print job is received from the external device. Accordingly, the routine does not advance to S104. The control section 15 executes in S106 only the print job set in S101.

Example 2

In an example 2, the control section 15 receives a print job from an external device while a user operates the operation section 13 to set another print job, and the counter value remains as much as both of the print jobs can be executed. In this case, the control section 15 determines in S103 that the print job is received from the external device. Then, the control section 15 determines in S104 that the counter value remains as much as both of the print jobs can be executed. As a result, the control section 15 executes in S105 the received print job. Subsequent to the received print job, the control section 15 executes in S106 the print job set in S101.

Example 3

In an example 3, the control section 15 receives a print job from an external device while a user operates the operation section 13 to set a print job, however, the counter value does not remain as much as both of the print jobs can be executed. In this case, the control section 15 determines in S103 that the printer job is received from the external device. Then, the control section 15 determines in S104 that the counter value does not remain as much as both of the print jobs can be executed. The routine does not advance to S105, and therefore, the control section 15 does not execute the received print job. The control section 15 executes in S106 only the print job set in S101. However, after the print job set in S101 has been executed, if the counter value remains as much as the received print job can be executed, the control section 15 executes in S109 the received print job.

Example 4

In an example 4, the control section 15 receives a print job from an external device when a user does not operate the operation section 13. In this case, the above described process flow is not executed. The received print job is immediately executed.

According to the multifunction device 1 in the first embodiment as described above, if the control section 15 receives a print job from an external device through the interface section 14 while a user operates the operation section 13 to set another print job, the control section 15 executes the received print job prior to executing the setting print job on condition that the counter value remains as much as both of the print jobs can be executed. Accordingly, compared to the conceivable case that the print job set in the operation section 13 is constantly given priority to be executed over the print job received from the external device, accessibility to the multifunction device 1 of the user who transmits the print job from the external device can be improved.

If the counter value does not remain as much as both of the print jobs can be executed, the control section 15 executes the setting print job. Accordingly, compared to the conceivable case that the print job received from the external device is constantly given priority to be executed over the print job set in the operation section 13, it can be reduced the burden imposed on the user who sets the print job in the operation section 13. According to the multifunction device 1, accessibility to the multifunction device 1 of the user who transmits the print job from the external device can be improved without imposing the burden only on the user who sets the print job in the operation section 13.

Further, according to the multifunction device 1, the control section 15 does not execute the received print job if the counter value does not remain as much as both of the print jobs can be executed. Accordingly, it can be avoided that the counter value is running out in the course of executing the received print job and that the received print job cannot be completed.

Further, according to the multifunction device 1, even if the control section 15 has determined that the counter value does not remain as much as both of the print jobs can be executed, the received print job is executed on conditions that the counter value remains as much as the received print job can be executed after the print job set in the operation section 13 has been executed. Accordingly, accessibility to the multifunction device 1 of the user who transmits the print job from the external device can be improved.

Further, according to the multifunction device 1, the control section 15 determines the necessary counter value for executing the setting print job based on the estimated number of recording sheets. Accordingly, the control section 15 can determine whether the counter value remains as much as both of the print jobs can be executed before these print jobs are actually executed.

Further, according to the multifunction device 1, the maximum value of the counter value to be consumed per print job is applied to the estimated number of recording sheets. If the control section 15 determines that the counter value remains as much as both of the print jobs can be executed, the counter value remains equal to or more than the maximum value when the print job set in the operation section 13 is executed after the received print job has been executed. Accordingly, it is unlikely that the print job set in the operation section 13 cannot be completed due to running out of the counter value in the course of executing the same.

Second Embodiment

Figure 4:
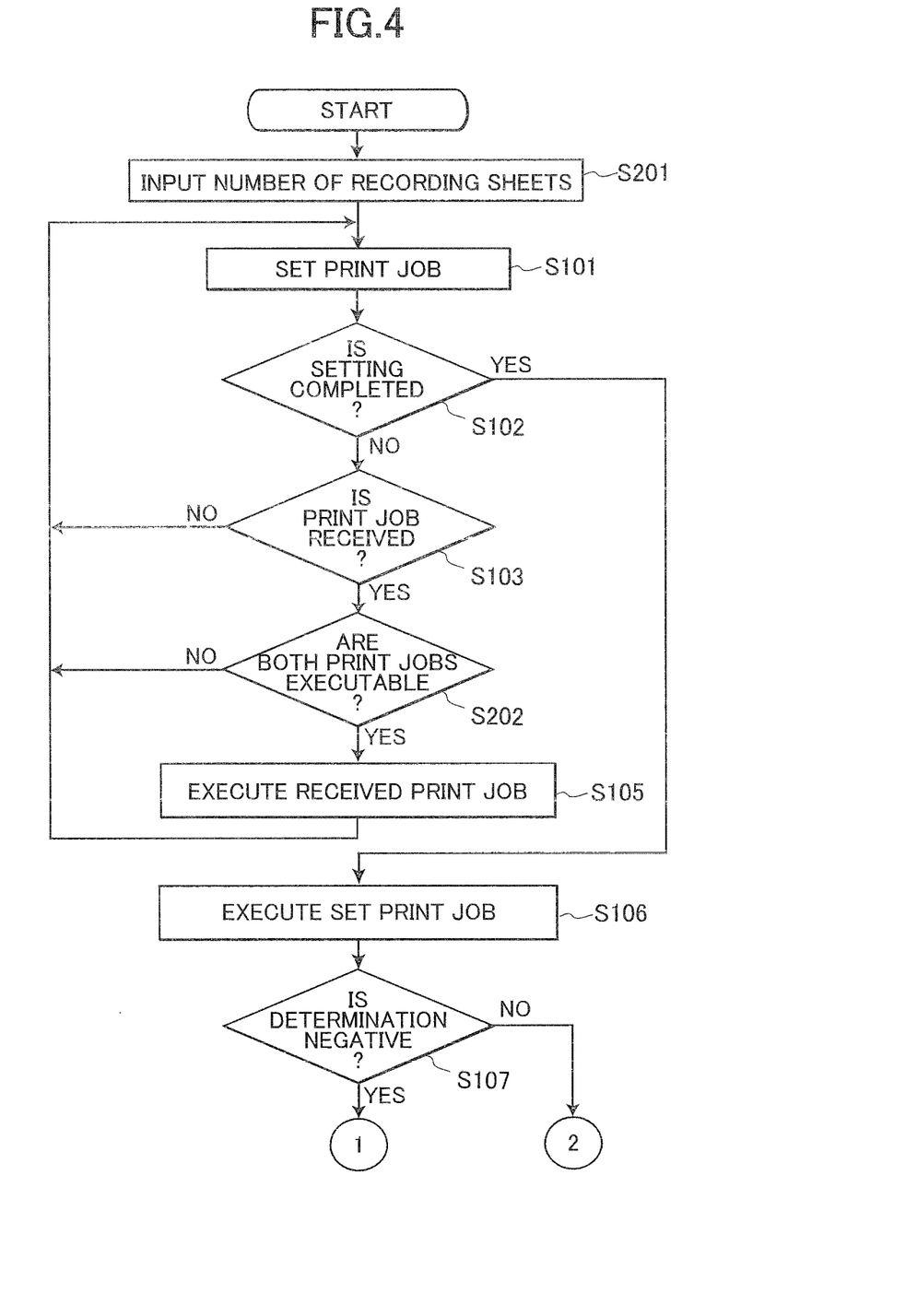
FIG. 4 is a flowchart illustrating a remaining part of steps in the process shown in FIG. 3.

Next, a second embodiment of the invention will be described while referring to FIGS. 4 and 5. In FIG. 4, steps the same as those in the first embodiment are designated by reference numerals the same as those shown in FIG. 2, and explanation of the steps having the same reference numerals are omitted for the sake of simplicity.

In the second embodiment, a user who intends to set a print job in the operation section 13 inputs the number of recording sheets necessary for executing the print job. If the counter value remains equal to or more than the sum of the number of recording sheets inputted by the user and the number of recording sheets necessary for executing a print job received from an external device, the control section 15 determines that the counter value remains as much as both of the print jobs can be executed.

Figure 5:
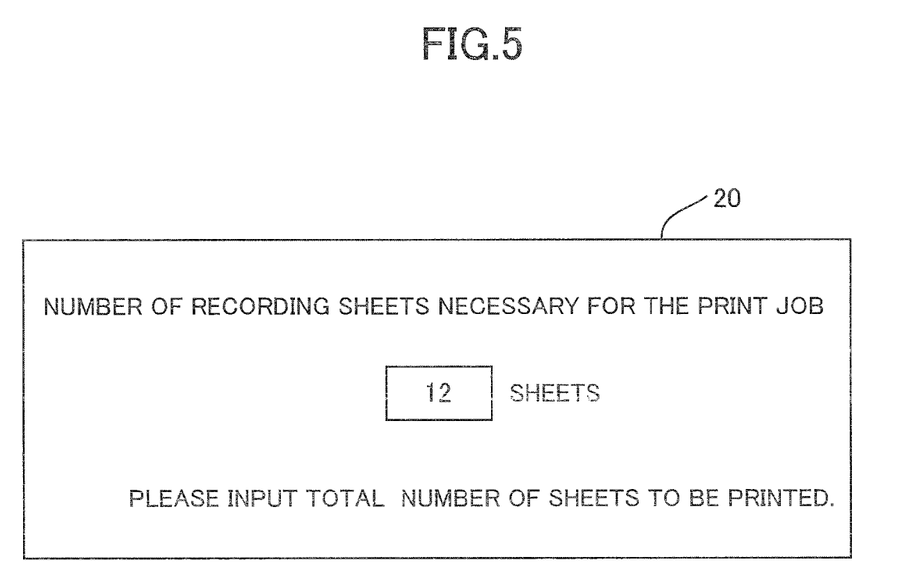
FIG. 5 is an explanatory diagram showing an input screen of an operation section according to the second embodiment.

At the beginning of the process, in S201, the control section 15 displays an input screen 20 as shown in FIG. 5 on the LCD of the operation section 13. The user operates the numeric keys of the operation section 13 to input the number of recording sheets necessary for executing the print job to be set in the operation section 13.

After the step S103, in S202 the control section 15 determines whether the counter value remains equal to or more than the sum of the number of recording sheets inputted by the user and the number of recording sheets necessary for executing the print job received from the external device. If the counter value is equal to or more than the sum (S202: Yes), the routine advances to S105. If the counter value is less than the sum (S202: No), the routine returns to S101.

In S107 of the second embodiment, the control section 15 determines whether the control section 15 has determined in S202 that the counter value does not remain as much as both of the print jobs can be executed.

The multifunction device 1 according to the second embodiment as described above allows the user to input the number of recording sheets necessary for executing the print job to be set in the operation section 13. The control section 15 determines, based on the inputted number of recording sheets, whether the counter value remains as much as both of the print jobs can be executed. Accordingly, prior to actually executing both of the print jobs, the control section 15 can determine whether the counter value remains as much as both of the print jobs can be executed.

The steps in the process in the second embodiment other than the above are substantially the same as those in the first embodiment.

Third Embodiment

Figure 6:
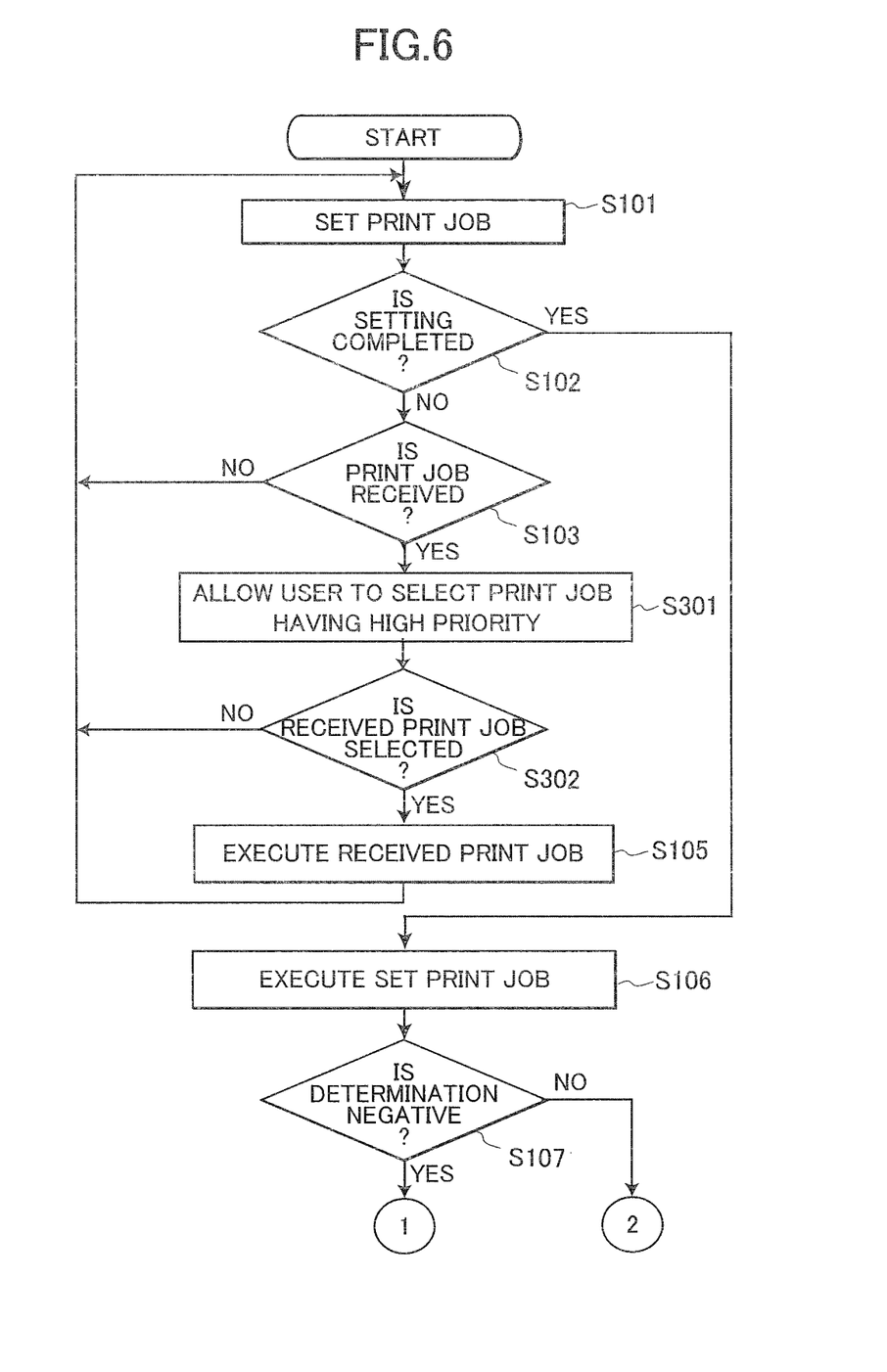
FIG. 6 is a flowchart illustrating steps in a process executed by the control section of the image forming device according to a third embodiment.

Next, a third embodiment of the invention will be described while referring to FIGS. 6 and 7. In FIG. 6, steps the same as those in the first embodiment are designated by reference numerals the same as those shown in FIG. 2, and explanation of the steps having the same reference numerals are omitted for the sake of simplicity.

In the third embodiment, if the control section 15 receives a print job from an external device through the interface section 14 while a user operates the operation section 13 to set another print job, the control section 15 provides the user with the current counter value and the number of recording sheets necessary for executing the received print job. The control section 15 allows the user to choose which of the print jobs should be given priority when executed.

Figure 7:
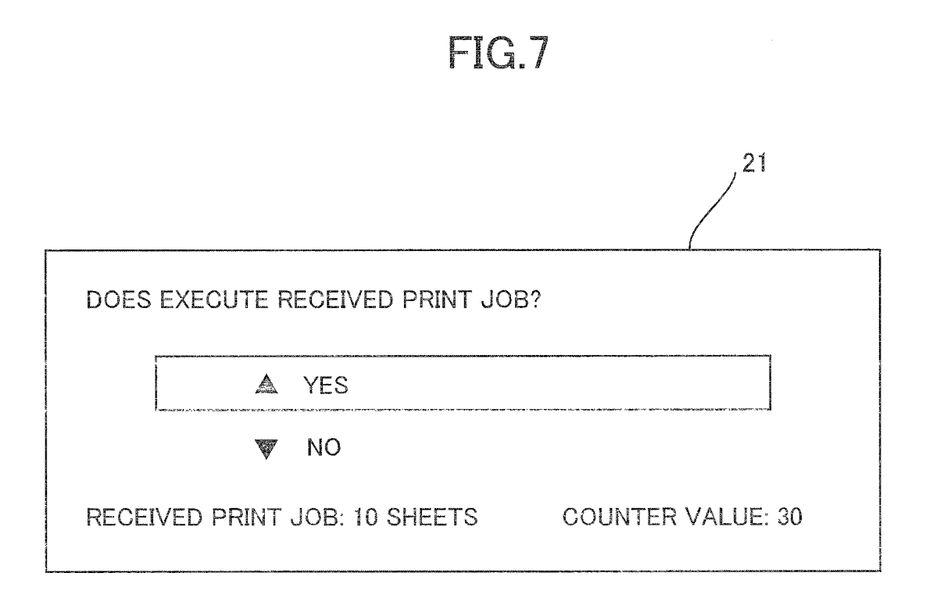
FIG. 7 is an explanatory diagram showing a selection screen of the operation section according to the third embodiment.

After the step S103, in S301, the control section 15 displays a selection screen 21 showing a message, such as, "Execute Received Print Job?" on the LCD of the operation section 13 as shown in FIG. 7. The user selects "YES" if the user decides that the received print job should be executed prior to the currently setting print job. The user selects "NO" if the user decides that the currently setting print job should be executed prior to the received print job.

After S301, in S302 the control section 15 determines whether the received print job is given priority over the currently setting print job by the user selection. That is, the control section 15 determines whether the user select "YES" or "NO". If "YES" is selected (S302: Yes), the routine advances to S105. The routine returns to S101 if "NO" is selected (S302: No).

In S107, the control section 15 determines whether the control section 15 has determined in S302 that the counter value does not remain as much as both of the print jobs can be executed.

The multifunction device 1 according to the third embodiment as described above provides the user with the current counter value and the number of recording sheets necessary for executing the received print job if the control section 15 receives the print job from the external device through the interface section 14 while the user operates the operation section 13 to set the print job. Accordingly, prior to choosing which of the print jobs should be given priority, the user who is setting the print job in the operation section 13 can determine whether the currently setting print job is not likely to be executed in case the received print job is executed prior to the currently setting print job. The user who is setting the print job in the operation section 13 selects the currently setting print job to be executed prior to the received print job (that is, the user selects "NO") if the currently setting print job is not likely to be executed, thereby reducing the burden imposed on the user.

If the user who is setting the print job in the operation section 13 selects the received print job to be executed prior to the currently setting print job (selects "YES"), the received print job is executed prior to the currently setting print job. Accordingly, accessibility to the multifunction device 1 of the user who transmits the print job from the external device can be improved. The multifunction device 1 according to the third embodiment improves accessibility of the user who transmits the print job from the external device without imposing the burden only on the user who sets the print job in the operation section 13.

The steps in the process according to the third embodiment other than the above are substantially the same as those in the process according to the first embodiment.

Fourth Embodiment

Next, a fourth embodiment of the invention will be described. According to the fourth embodiment, if a plurality of users attempts to operate the operation section 13 simultaneously, the users can reserve their rights to use the operation section 13.

If a user A intends to operate the operation section 13 to set a print job when another user B has already operated the operation section 13, the user A needs to wait for the user B to finish operating the operation section 13. In this case, the user A reserves his/her right to use the operation section 13, and waits for the user B to finish operating the operation section 13.

The reservation of the right to use may be executed by inputting a password allotted to each user, for example. Alternatively, an IC card distributed to each user may be inserted into the operation section 13 to reserve the right to use. Further, if the user presses a predetermined button of the operation section 13, random numerical characters are displayed on the LCD. The user may memorize the numerical characters and input the same in the operation section 13 as a password, when the user operates the operation section 13.

For example, if the user A inputs the password to reserve the operation section 13, another user does not allow to access the operation section 13 except for making a reservation until the user A inputs the password after the user B finished operating the operation section 13. When the user A inputs the password, the operation section 13 returns to be an operable state. Accordingly, only the user A can operate the operation section 13.

After the user A reserves the right to use, the operation section 13 may receive a print job from an external device before the user A starts operating the operation section 13. In this case, because the user A has not yet operated the operation section 13 for setting the print job, the received print job may be given priority to be executed over the print job to be set by the user A, regardless of whether the counter value remains as much as both of the received print job and the print job to be set by the user A.

Further, if the user A does not operate the operation section 13 even though a predetermined period of time has elapsed after the user B finished operating the operation section 13, the reservation of the right to use made by the user A may be cancelled.

The multifunction device 1 according to the fourth embodiment can avoid being operated by a user who comes after the user A, if the user A intends to operate the operation section 13 immediately after the user B finishes operating the operation section 13.

Modifications

While the invention has been described in detail with reference to the embodiments thereof, it would be apparent to those skilled in the art that various changes and modifications may be made therein without departing from the spirit of the invention.

(1) In the above embodiments, the counter value serves as the print resource. However, the recording sheets accommodated in the paper tray 12A, the toner, and the remaining number of rotations of the photosensitive drum are also applicable to the print resource.

For example, if the recording sheets accommodated in the paper tray 12A are applied to the print resource, it is necessary to provide a process to obtain the current number of recording sheets in the paper tray 12A. The user may input the number of recording sheets when the user accommodates the recording sheets in the paper tray 12A. The counter value may be decremented by one when each recording sheet is consumed. Alternatively, a mechanism automatically to count the number of sheets of the consumed recording sheet may be provided. The same applies to the toner. A remaining amount of toner is generally monitored, so that the remaining amount of toner may be used as the print resource.

(2) In the first embodiment, if the control section 15 determines that the counter value remains as much as both of the print job set in the operation section 13 and the print job received from the external device can be executed, the control section 15 executes the received print job and the set print job in this order. If the control section 15 determines that the counter value does not remain as much as both of the print jobs can be executed, the control section 15 executes only the set print job. However, to the contrary, if the control section 15 determines that the counter value remains as much as both of the print jobs can be executed, the control section 15 may execute the set print job and the received print job in this order. If the control section 15 determines that the counter value does not remain as much as both of the print jobs can be executed, the control section 15 may execute only the received print job.

(3) In the first embodiment, the number of recording sheets necessary for executing the copying job is estimated based on the maximum value of the counter value to be consumed per print job. The maximum number of sheets of document accommodatable in the paper feeding tray 12A is applied to the maximum value. However, the multifunction device 1 may be configured such that the administrator can set the maximum value of the counter value to be consumed per print job. Based on the maximum value set by the administrator, the control section 15 may determine whether the counter value remains as much as both of the print jobs can be executed.

(4) In the above embodiments, the laser type printer is applied to the printer section 12. However, a printer of ink jet type may be adopted.

(5) In the above embodiments, the multifunction device 1 as the image forming device includes the scanner section 11 and the printer section 12. However, a so-called printer without the scanner section 11 is also applicable to the image forming device. In this case, the copying job is not executable.

Figure 8:
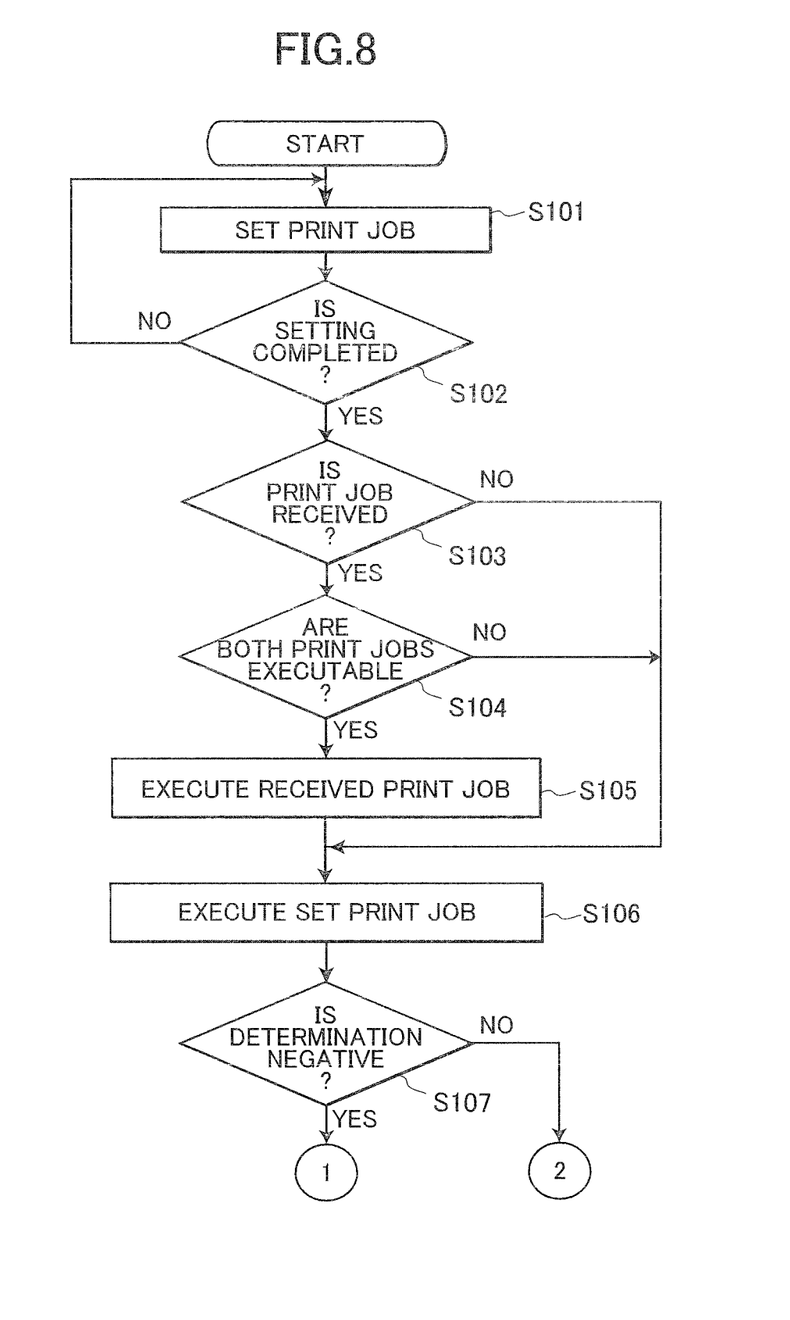
FIG. 8 is a flowchart illustrating steps in a process executed by the control section of the image forming device according to a modification of the first embodiment.

(6) In the above embodiments, the control section 15 determines whether the counter value remains as much as both of the print jobs can be executed while the user sets the print job. However, as shown in FIG. 8, the control section 15 may determine whether the counter value remains as much as both of the print jobs can be executed after the user has set the print job. In this case, where the user sets the print job to print images stored in the USB storage device by the operation section 13, the number of recording sheets to be consumed can be fixed when the print job that prints images stored in the USB storage device has been set in the operation section 13. Thus, the control section 15 can accurately determine in S104 whether the counter value remains as much as both of the print jobs can be executed, without applying the estimated number of sheets of the recording sheet.

What is claimed is:

1. An image forming device comprising:
   an operation unit by which a user sets a print job to print an image on a recording sheet;
   a job executing unit that is configured to execute a print job, the job executing unit consuming print resource through the print job;
   a receiving unit that is configured to receive a print job from an external device, the print job received at the receiving unit containing information about an amount of print resource to be consumed when executed by the job executing unit;
   a first determining unit that is configured to determine whether the receiving unit receives a print job while the user is setting another print job by the operation unit; and
   a second determining unit that is configured to determine whether the print resource remains such that both the received print job and the another print job can be executed when the first determining unit determines that the receiving unit receives the print job while the user is setting the another print job by the operation unit,
   the second determining unit being further configured to estimate an amount of the print resource necessary for executing the another print job and determine that the print resource remains such that both the received print job and the another print job can be executed when a remaining amount of the print resource is greater than or equal to a sum of the estimated amount of the print resource and an amount of print resource to be consumed for the received print job,
   wherein the job executing unit sets an order of priority for executing the print job among the received print job and the another print job based on the determination result of the second determining unit.

2. The image forming device according to claim 1, wherein the job executing unit executes the received print job prior to the another print job if the second determining unit determines that the print resource remains such that both the received print job and the another print job can be executed, whereas the job executing unit executes only the another print job when the print resource does not remain such that both the received print job and the another print job can be executed.

3. The image forming device according to claim 1, further comprising a third determining unit that is configured to determine whether the print resource remains such that the received print job can be executed after the job executing unit executes the another print job if the second determining unit determines that the print resource does not remain such that both the received print job and the another print job can be executed.

4. The image forming device according to claim 1, wherein the job executing unit is limited to consume the print resource not to exceed a predetermined maximum in one print job,
   wherein the second determining unit sets the predetermined maximum as the estimated amount.

5. The image forming device according to claim 4, further comprising:
   a document tray that accommodates a plurality of documents; and
   a scanning unit that scans a document while automatically conveying the document from the document tray and generates image data,
   wherein the another print job set by the operation unit indicates to print an image based on the image data generated by the scanning unit,
   wherein the predetermined maximum is a maximum number of the documents that the document tray is capable of accommodating.

6. The image forming device according to claim 1, wherein the operation unit includes an prompting unit that prompts the user to set an amount of print resource for executing the another print job,
   wherein the second determining unit determines that the print resource remains such that both the received print job and the another print job can be executed when a remaining amount of print resource is greater than or equal to a sum of the amount of print resource set by the user and an amount of print resource to be consumed for the received print job.

7. The image forming device according to claim 1, further comprising a storing unit that stores the remaining amount of the print resource, wherein the second determining unit acquires the remaining amount of the print resource from the storing unit.

8. The image forming device according to claim 1, further comprising:

a recording sheet accommodating unit that accommodates recording sheets;

a photosensitive drum that has a surface on which a latent image is formable, the photosensitive drum being set to be capable of rotating within a predetermined number of rotations;

a toner accommodating unit that accommodates a toner;

a developing roller that develops the latent image to provide a toner image; and a transfer unit that transfers the toner image onto a recording sheet, wherein the print resource is one selected from the group consisting of recording sheets accommodated in the recording sheet accommodating unit, the toner accommodated in the toner accommodating unit, and a remaining rotation number of the photosensitive drum allowed to rotate up to the predetermined number or rotations.

9. A method for forming an image by an image forming device, the method comprising:

(a) receiving an operation, by a user, to set a print job printing an image on a recording sheet;

(b) executing a print job, print resource being consumed through the print job by the executing step (b);

(c) receiving a print job from an external device, the print job received from the external device in the receiving step (c) containing information about an amount of print resource to be consumed when executed by the executing step (b);

(d) determining whether the receiving step (c) receives the print job while the user is setting another print job through the receiving step (a); and (e) determining whether the print resource remains such that both the received print job and the another print job can be executed when the determining step (d) determines that the receiving step (c) receives a print job while the user is setting the another print job through the receiving step (a), (f) estimating an amount of the print resource necessary for executing the another print job and determining in step (e) that the print resource remains such that both the received print job and the another print job can be executed when a remaining amount of the print resource is greater than or equal to a sum of the estimated amount of the print resource and an amount of print resource to be consumed for the received print job, wherein the executing step (b) sets an order of priority for executing the print job among the received print job and the another print job based on the determination result of the determining step (e).

* * * * *